United States Patent
Tanaka et al.

(10) Patent No.: US 9,596,408 B2
(45) Date of Patent: *Mar. 14, 2017

(54) IMAGE CAPTURING APPARATUS

(71) Applicants: Tomonori Tanaka, Kanagawa (JP); Noriyuki Terao, Miyagi (JP); Yoshiaki Irino, Kanagawa (JP); Toru Harada, Kanagawa (JP); Hideaki Yamamoto, Kanagawa (JP); Hirokazu Takenaka, Kanagawa (JP); Satoshi Sawaguchi, Kanagawa (JP); Nozomi Imae, Kanagawa (JP); Daisuke Bessho, Kanagawa (JP); Kensuke Masuda, Kanagawa (JP); Hiroyuki Satoh, Kanagawa (JP); Makoto Shohara, Tokyo (JP); Shusaku Takasu, Kanagawa (JP)

(72) Inventors: Tomonori Tanaka, Kanagawa (JP); Noriyuki Terao, Miyagi (JP); Yoshiaki Irino, Kanagawa (JP); Toru Harada, Kanagawa (JP); Hideaki Yamamoto, Kanagawa (JP); Hirokazu Takenaka, Kanagawa (JP); Satoshi Sawaguchi, Kanagawa (JP); Nozomi Imae, Kanagawa (JP); Daisuke Bessho, Kanagawa (JP); Kensuke Masuda, Kanagawa (JP); Hiroyuki Satoh, Kanagawa (JP); Makoto Shohara, Tokyo (JP); Shusaku Takasu, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,105

(22) Filed: Feb. 29, 2016

(65) Prior Publication Data
US 2016/0182825 A1     Jun. 23, 2016

Related U.S. Application Data

(63) Continuation of application No. 13/951,623, filed on Jul. 26, 2013, now Pat. No. 9,307,144.

(30) Foreign Application Priority Data

Aug. 1, 2012   (JP) .................................. 2012-170798

(51) Int. Cl.
*H04N 5/232* (2006.01)
*H04N 5/77* (2006.01)
(Continued)

(52) U.S. Cl.
CPC ........... *H04N 5/23238* (2013.01); *G06T 1/60* (2013.01); *H04N 5/2258* (2013.01); *H04N 5/247* (2013.01); *H04N 5/77* (2013.01)

(58) Field of Classification Search
CPC .... H04N 5/23238; H04N 5/77; H04N 5/2258; G06T 1/60
(Continued)

(56) References Cited

U.S. PATENT DOCUMENTS 5,125,046 A * 6/1992 Siwoff ................. G02B 27/017
                                                    348/27
5,444,554 A    8/1995 Muramatsu et al.
(Continued)

FOREIGN PATENT DOCUMENTS

JP    H02264571 A    10/1990
JP    H06315114 A    11/1994
(Continued)

OTHER PUBLICATIONS

Office Action for Corresponding Japanese Application No. 2012-170798 issued on Jun. 14, 2016.

*Primary Examiner* — Hee-Yong Kim
(74) *Attorney, Agent, or Firm* — Harness, Dickey & Pierce, P.L.C.

(57) ABSTRACT

An image capturing apparatus includes image capturing devices; page memories for the image capturing devices, respectively, each page memory storing a piece of image data output from the corresponding image capturing device; a page-memory read unit configured to read pieces of image data stored in the page memories line by line in a time
(Continued)

division manner; an image processing unit configured to perform predetermined image processing on the pieces of image data read from the page memories for the image capturing devices line by line in the time division manner; and a write monitoring unit configured to monitor write states of the pieces of image data that are output from the image capturing devices and written into the page memories, and control the page-memory read unit to start reading the pieces of image data from the page memories.

8 Claims, 4 Drawing Sheets

(51) Int. Cl.
*G06T 1/60* (2006.01)
*H04N 5/247* (2006.01)
*G06K 9/40* (2006.01)
*H04N 1/46* (2006.01)
*H04N 5/225* (2006.01)

(58) Field of Classification Search
USPC .............................................. 348/38
See application file for complete search history.

(56) References Cited

U.S. PATENT DOCUMENTS

| | | |
|---|---|---|
| 5,712,714 A | 1/1998 | Sasahara |
| 7,782,396 B2 | 8/2010 | Haneda |
| 2013/0235149 A1 | 9/2013 | Tanaka et al. |

FOREIGN PATENT DOCUMENTS

| | | |
|---|---|---|
| JP | H08111846 A | 4/1996 |
| JP | 2006033810 A | 2/2006 |
| JP | 2007-096915 A | 4/2007 |
| JP | 2013-055541 A | 3/2013 |
| JP | 2013-175128 A | 9/2013 |
| JP | 2013-183383 A | 9/2013 |
| JP | 2013-214952 A | 10/2013 |
| JP | 2014-179841 A | 9/2014 |

* cited by examiner

IMAGE CAPTURING APPARATUS

CROSS-REFERENCE TO RELATED APPLICATION

The present application is a continuation of and claims priority under 35 U.S.C. §§120/121 to U.S. patent application Ser. No. 13/951,623, filed on Jul. 26, 2013, which claims priority to Japanese Patent Application No. 2012-170798 filed in Japan on Aug. 1, 2012, the entire contents of each of which are incorporated herein by reference.

BACKGROUND OF THE INVENTION

1. Field of the Invention

The present invention generally relates to an image capturing apparatus and an image processing method.

2. Description of the Related Art

There are conventionally known omnidirectional image capturing apparatuses that create a panoramic image by capturing omnidirectional images using a plurality of image capturing devices (CMOS sensors or the like) and combining plurality of data sets acquired by the image capturing.

However, in such a conventional omnidirectional image capturing apparatus, a plurality of image processing circuits respectively associated with the image capturing devices perform black level correction, color interpolation, correction of dropout pixels, and other necessary image processing on the plurality of pieces of image data acquired using the plurality of image capturing devices. Consequently, as the number of the image capturing devices increases, an amount of hardware for image processing increases, leading to a problem of an increase in cost. Moreover, because the plurality of pieces of image data are handled separately, there is a problem of complicated data handling.

For instance, Japanese Patent Application Laid-open No. 2006-033810 discloses a multi-sensor panoramic network camera that includes a plurality of image sensors (image capturing devices), a plurality of image processors (image processing circuits), an image postprocessor, and a network interface, in which the image processing circuits and the image sensors are equal in number.

Therefore, there is a need, concerning an image capturing apparatus such as an omnidirectional image capturing apparatus that uses a plurality of image capturing devices, to solve the problem of an increase in cost due to an increase in an amount of hardware for image processing resulting from an increase in the number of the image capturing devices and the problem of complicated data handling incident to handing plurality of pieces of image data separately, and to increase reliability.

SUMMARY OF THE INVENTION

It is an object of the present invention to at least partially solve the problems in the conventional technology.

According to an embodiment, an image capturing apparatus that includes a plurality of image capturing devices; a plurality of page memories for the image capturing devices, respectively, each page memory storing a piece of image data output from the corresponding image capturing device; a page-memory read unit configured to read pieces of image data stored in the page memories line by line in a time division manner; a single image processing unit configured to perform predetermined image processing on the pieces of image data read from the page memories for the image capturing devices line by line in the time division manner; and a write monitoring unit configured to monitor write states of the pieces of image data that are output from the image capturing devices and written into the page memories, and control the page-memory read unit to start reading the pieces of image data from the page memories.

According to another embodiment, an image processing method performed in an image capturing apparatus that includes a plurality of image capturing devices and a plurality of page memories for the image capturing devices, respectively, each page memory storing a piece of image data output from the corresponding image capturing device. The image processing method includes reading pieces of image data stored in the page memories line by line in a time division manner; performing predetermined image processing on the pieces of image data read from the page memories for the image capturing devices line by line in the time division manner; monitoring write states of the pieces of image data that are output from the image capturing devices and written into the page memories; and controlling the page-memory read unit to start reading the pieces of image data from the page memories.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of the present invention is described below with reference to the accompanying drawings. An image capturing apparatus described below is embodied as an omnidirectional image capturing apparatus that uses two image capturing devices. However, the number of the image capturing devices can generally be any number equal to or greater than two. The image capturing apparatus is not necessarily an omnidirectional image capturing apparatus.

Figure 1:
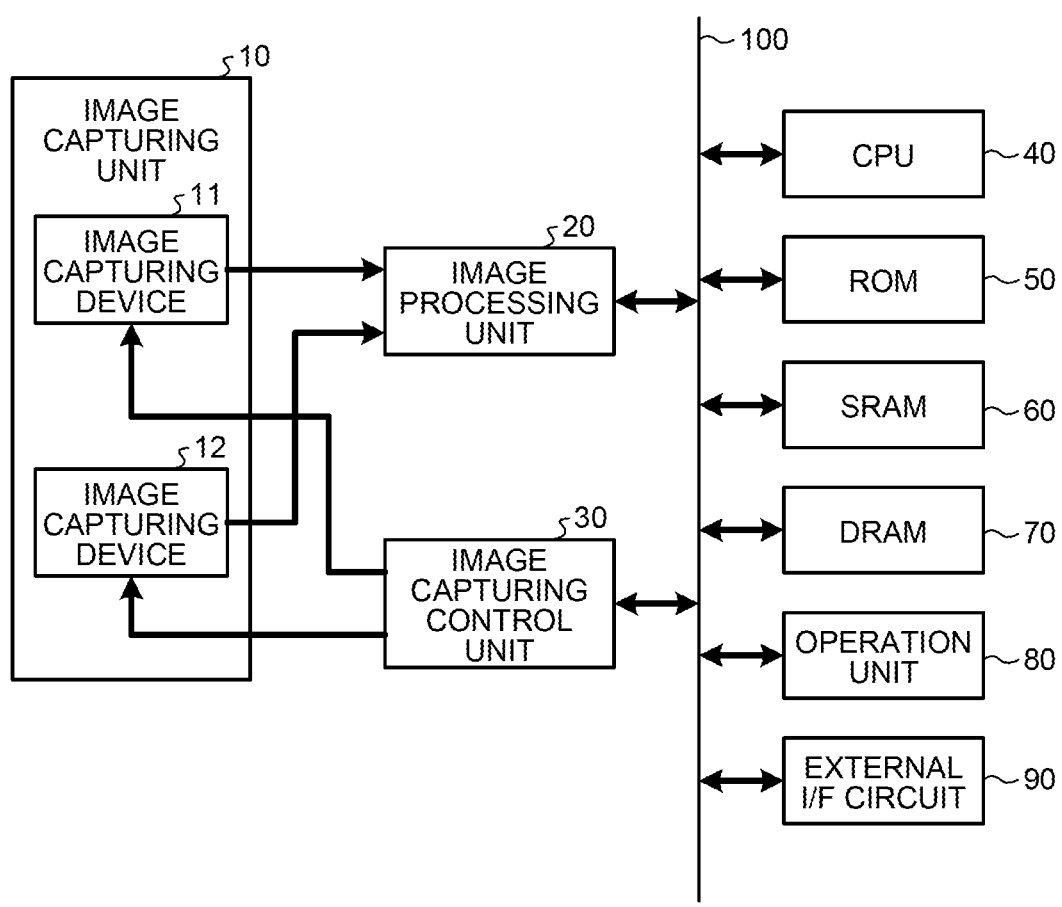
FIG. 1 is an overall schematic diagram of an omnidirectional image capturing apparatus as an example of an image capturing apparatus according to an embodiment.

FIG. 1 is an overall configuration diagram of the omnidirectional image capturing apparatus according to the embodiment. The omnidirectional image capturing apparatus includes an image capturing unit 10, an image processing unit 20, an image capturing control unit 30, a CPU 40, memories, an operation unit 80, and an external I/F circuit 90 that are housed in an image-capturing-apparatus casing. The memories include a ROM 50, an SRAM 60, and a DRAM 70.

The image capturing unit 10 includes two image capturing devices, which are image capturing devices 11 and 12. Each of the image capturing devices 11 and 12 includes a fisheye lens, an image sensor such as a CMOS sensor, a timing generating circuit, and a register set. The fisheye lens has an angle of view equal to or greater than 180 degrees for forming a hemispherical image. The image sensor converts an optical image captured through the fisheye lens into image data represented by electrical signals and outputs the image data. The timing generating circuit generates horizontal/vertical sync signals and pixel clocks for the image sensor. The register set is to be loaded with various types of commands, parameters, and the like necessary for operations of the image capturing device. This type of image capturing device is well known, and specific configuration of the image capturing devices 11 and 12 is omitted.

Each of the image capturing devices 11 and 12 of the image capturing unit 10 is connected to the image processing unit 20 via a parallel I/F bus and, independently therefrom, connected to the image capturing control unit 30 via a serial I/F bus ($I^2C$ bus or the like). The image processing unit 20 and the image capturing control unit 30 are connected to the CPU 40 via a bus 100. The ROM 50, the SRAM 60, the DRAM 70, the operation unit 80, the external I/F circuit 90, and the like are also connected to the bus 100.

The image processing unit 20 generates spherical image data by acquiring pieces of image data output from the image capturing devices 11 and 12 via the parallel I/F buses, performing predetermined processing on each of the pieces of image data, and combining these pieces of image data. The present invention particularly relates to the image processing unit 20. A configuration and operations of the image processing unit 20 will be described in detail later.

The image capturing control unit 30 generally loads the commands and the like, in which the image capturing control unit 30 is assumed as a master device and the image capturing devices 11 and 12 are assumed as slave devices, into the register sets of the image capturing devices 11 and 12 by utilizing the $I^2C$ buses. The necessary commands and the like are fed from the CPU 40. The image capturing control unit 30 also acquires status data and the like of the register sets of the image capturing devices 11 and 12 by utilizing the $I^2C$ buses and transmits the status data and the like to the CPU 40.

The image capturing control unit 30 instructs the image capturing devices 11 and 12 to output image data at an instant when a shutter release button of the operation unit 80 is pressed. Some image capturing apparatuses have a function of displaying a preview on a display (not illustrated in FIG. 1) and an ability of supporting a motion video. The image capturing devices 11 and 12 of such an image capturing apparatus output image data continuously at a predetermined frame rate (frames/min.). The image capturing control unit 30 is basically similar to conventional ones, and further description is omitted.

The CPU 40 controls operations of the entire image capturing apparatus and performs necessary processing. The ROM 50 stores various types of program instructions for the CPU 40. The SRAM 60 and the DRAM 70, which are working memories, store program instructions for execution by the CPU 40, data in a course of being processed, and the like. Particularly, the DRAM 70 stores image data in a course of being processed by the image processing unit 20 and processed spherical image data.

Collectively referred to as the operation unit 80 are various types of operation buttons, a power switch, the shutter release button, and the like. A user operates the operation buttons, thereby inputting various photographing modes, photographing conditions, and the like.

Collectively referred to as the external I/F circuit 90 are interface circuits (a USB I/F and the like) to external memory (an SD card, a flash memory, and the like), a personal computer, and the like. The external I/F circuit 90 may be a network I/F no matter whether the network I/F is wireless or wired. Spherical image data stored in the DRAM 70 may be stored in the external memory via the external I/F circuit 90, or transferred to the personal computer via the external I/F circuit 90, which is the network I/F, as required.

Configuration and operations of the image processing unit 20 are described in detail below.

Figure 2:
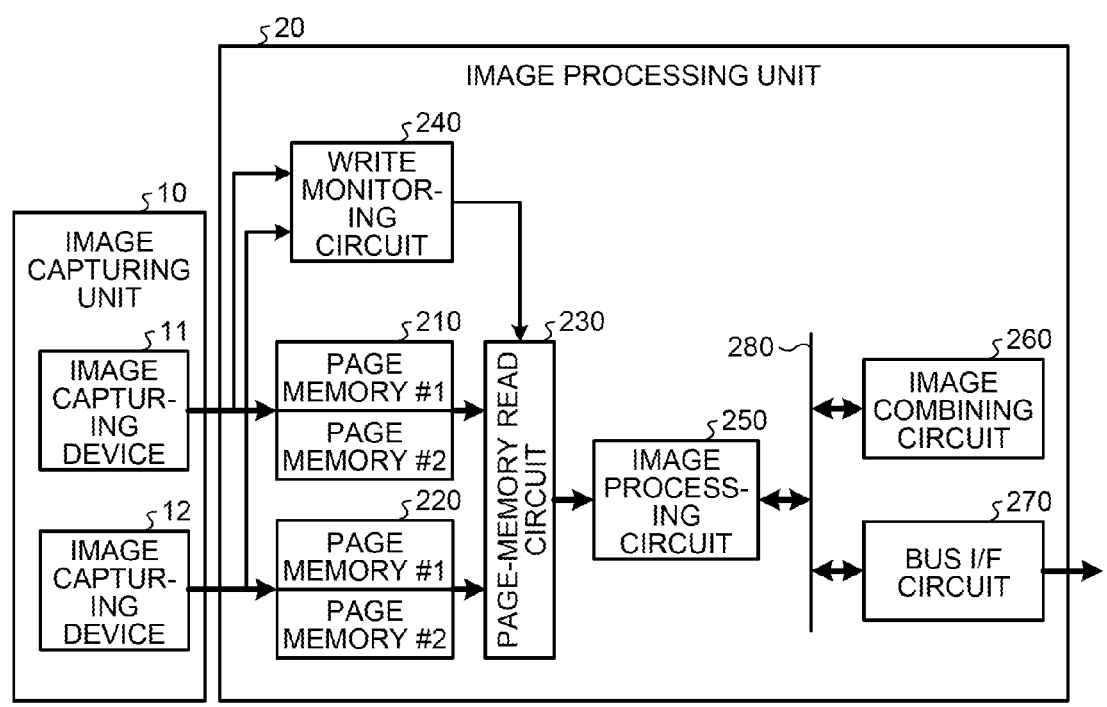
FIG. 2 is a detailed configuration diagram of an image processing unit illustrated in FIG. 1 according to the embodiment.

FIG. 2 is a detailed configuration diagram of the image processing unit 20 according to the embodiment. The image processing unit 20 includes a page memory 210 associated with the image capturing device (1) 11, a page memory 220 associated with the image capturing device (2) 12, a page-memory read circuit 230, a write monitoring circuit 240, a single image processing circuit 250, an image combining circuit 260, a bus I/F circuit 270, and an internal bus 280 that connects the image processing circuit 250, the image combining circuit 260, and the bus I/F circuit 270 to one another.

Each of the page memories 210 and 220 sequentially stores pieces of image data output line by line from corresponding one of the image capturing devices 11 and 12. In the embodiment, each of the page memories 210 and 220 associated with the image capturing devices 11 and 12, respectively, is configured to have page memories for two pages. In other words, each of the page memories 210 and 220 can store up to two pages of image data output from the image capturing device 11 or 12. The page memory 210 sequentially stores pieces of image data output from the image capturing device 11 in the page memories while toggling at each page of the image data such that: page memory #1, page memory #2, page memory #1, . . . . Similarly, the page memory 220 sequentially stores pieces of image data output from the image capturing device 12 in the page memories while toggling at each page of the image data such that: page memory #1, page memory #2, page memory #1, . . . .

The page-memory read circuit 230 controls read of the pieces of image data from the page memory 210, 220 independently from writing into the page memory 210, 220. The page-memory read circuit 230 has a read pointer indicating page memories, from which image data is to be read out next, of the page memories 210 and 220. Upon receiving a page-memory-read-start signal from the write monitoring circuit 240, the page-memory read circuit 230 reads out pieces of image data from the page memories, which are indicated by the read pointer, of the page memories 210 and 220 line by line in a time division manner. Upon completion of read from the page memories indicated by the read pointer, the page-memory read circuit 230 updates the read pointer so that read from next page memories can be performed. More specifically, the read pointer is updated in a toggled manner as follows: 1→2→1→2→1→. . . . As described above, upon receiving the page-memory-read-start signal from the write monitoring circuit 240, the page-memory read circuit 230 sequentially reads out pieces of image data from each of the page memories 210 and 220 while toggling at each line of the image data such that: page memory #1, page memory #2, page memory #1, . . . in the time division manner. The write monitoring circuit 240 will be described later.

The image processing circuit 250 receives inputs of the pieces of image data read out by the page-memory read circuit 230 line by line in the time division manner from the page memories of the page memories 210 and 220 and sequentially performs predetermined image processing on the pieces of image data in real time. The image processing circuit 250 also receives sync signals and the like supplied from the page-memory read circuit 230. The image processing to be performed by the image processing circuit 250 can include black level correction, color correction, correction of dropout pixels, and white balance adjustment. The pieces of image data output from the image capturing devices 11 and 12 and image-processed by the image processing circuit 250 are transferred to the DRAM 70 via the bus I/F circuit 270. The pieces of image data of the image capturing devices 11 and 12 transferred to the DRAM 70 are separated into a piece of image data of the image capturing device 11 and a piece of image data of the image capturing device 12, and written into a storage area for the image capturing device 11 and a storage area for the image capturing device 12, respectively, in the DRAM 70.

Meanwhile, some image processing performed by the image processing circuit 250, such as lens distortion correction, cannot be performed collectively at one time on the pieces of image data output from the image capturing device 11 and the image data output from the image capturing device 12. This can be solved by performing such image processing as follows. First, a processed image data set corresponding to one frame of the image capturing device 11 and a processed image data set corresponding to one frame of the image capturing device 12 are stored in the DRAM 70. Thereafter, the CPU 40 reads out each of the pieces of image data of the image capturing devices 11 and 12 and transmits the pieces of image data to the image processing circuit 250. The image processing circuit 250 further performs the predetermined image processing on the pieces of image data, and writes the pieces of image data into the DRAM 70 again.

The image combining circuit 260 acquires the pieces of image data of the image capturing devices 11 and 12 from the DRAM 70 via the bus I/F circuit 270, and combines the pieces of image data. Stored in the DRAM 70 are two hemispherical pieces of image data, each of which is acquired by image capturing by the image capturing device 11 or 12 and on which the predetermined image processing is performed. As described above, because each of the two hemispherical pieces of image data is a piece of image data having an angle of view that is equal to or greater than 180 degrees, each of the pieces of image data has an overlap area. The image combining circuit 260 generates spherical image data by combining the two hemispherical pieces of image data utilizing the overlap areas.

The generated spherical image data is stored again in the DRAM 70 via the bus I/F circuit 270. Thereafter, the spherical image data in the DRAM 70 may be stored in the external memory, or transferred to the personal computer or the like via the external I/F circuit 90 as required.

The write monitoring circuit 240 is described below. The write monitoring circuit 240 is a circuit that monitors writing of pieces of image data output from the image capturing devices 11 and 12 into the page memories 210 and 220. Each of the image capturing devices 11 and 12 outputs horizontal/vertical sync signals, pixel clocks, and the like in conjunction with the pieces of image data. The write monitoring circuit 240 monitors the sync signals output from the image capturing devices 11 and 12 to issue the page-memory-read-start signal to the page-memory read circuit 230 at an instant when pieces of image data corresponding to one page output from each of the image capturing devices 11 and 12 have been stored in the page memories 210 and 220.

In the embodiment, each of the page memories 210 and 220 associated with the image capturing devices 11 and 12 is configured to have the page memories for two pages. With this configuration, out of synchronization of the pieces of image data output from the image capturing devices 11 and 12 is allowable by up to one page. The write monitoring circuit 240 issues the page-memory-read-start signal to the page-memory read circuit 230 at an instant when pieces of image data corresponding to one page output from each of the image capturing devices 11 and 12 have been stored in the page memories 210 and 220.

Upon receiving the page-memory-read-start signal from the write monitoring circuit 240, the page-memory read circuit 230 starts reading out the pieces of image data from the page memories 210 and 220. More specifically, in the embodiment, the page-memory read circuit 230 can select page memories, in which pieces of image data each corresponding to one page are already stored, from the page memories in the page memories 210 and 220 according to a fixed order in a toggled manner and read out the pieces of image data line by line in a time division manner. Accordingly, even when pieces of image data output from the image capturing devices 11 and 12 are out of synchronization, it is possible to deliver the pieces of image data output from the image capturing devices 11 and 12 properly from a leading end of each page to the downstream image processing circuit 250.

Meanwhile, in the embodiment, each of the page memories 210 and 220 is configured to have the page memories for two pages. However, the number of the page memories can be determined according to characteristics of the image capturing device (CMOS sensor) and the like. When the image capturing devices (CMOS sensors) are of a same type and exhibit same characteristics and small variances, each of the page memories 210 and 220 may have page memory for one page.

Writing to and read from the page memory 210, 220 are performed independently. Write clock and read clock of the page memory 210, 220 differ from each other in frequency in such a manner that the frequency of the read clock is n (n≥2) times as high as or higher than the frequency of the write clock. This setting allows the image processing circuit 250 to perform writing and read to and from the page memories 210 and 220 line by line in real time.

Figure 3:
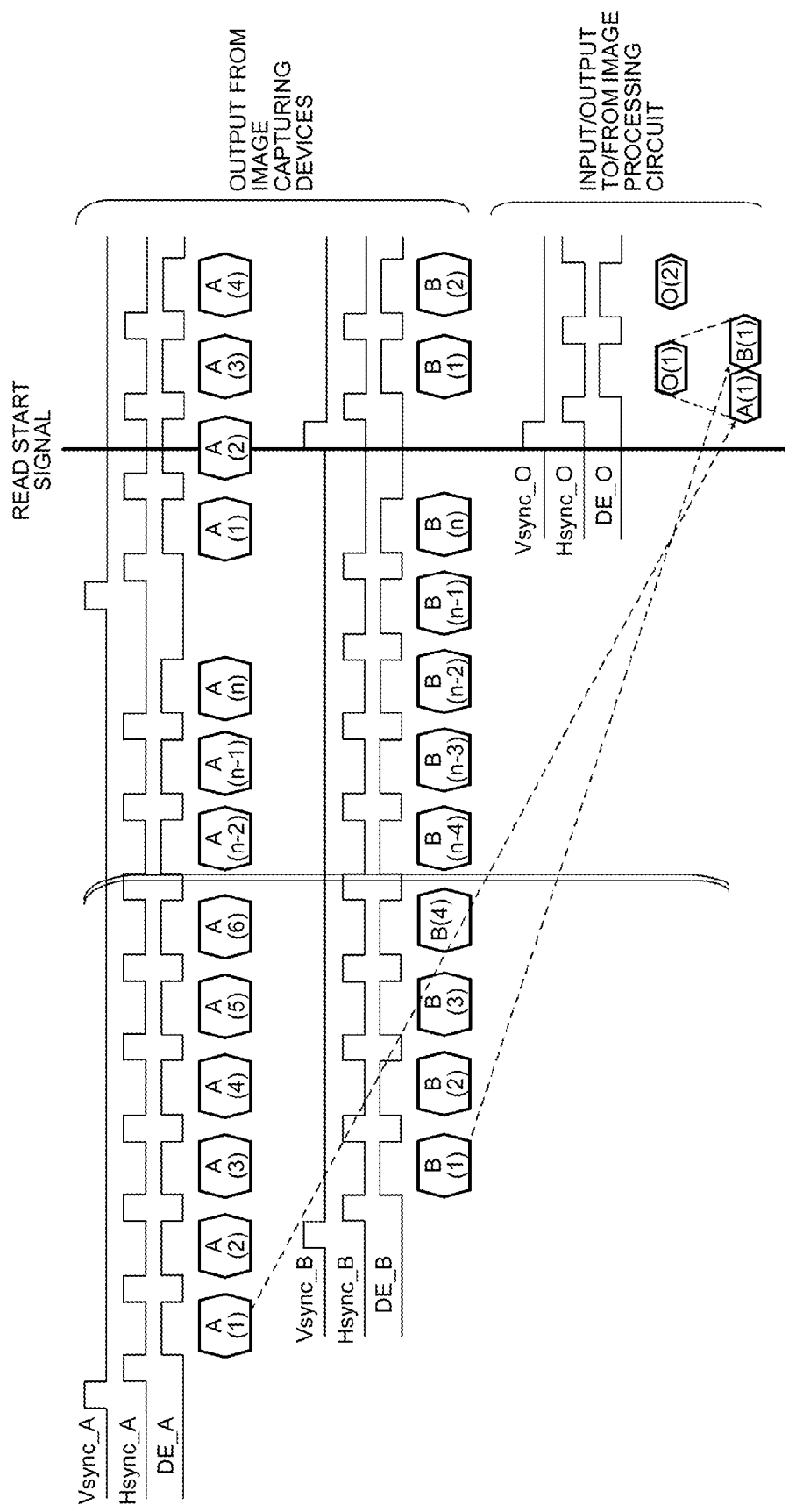
FIG. 3 is a diagram illustrating how pieces of image data are transferred according to the embodiment.
Figure 4:
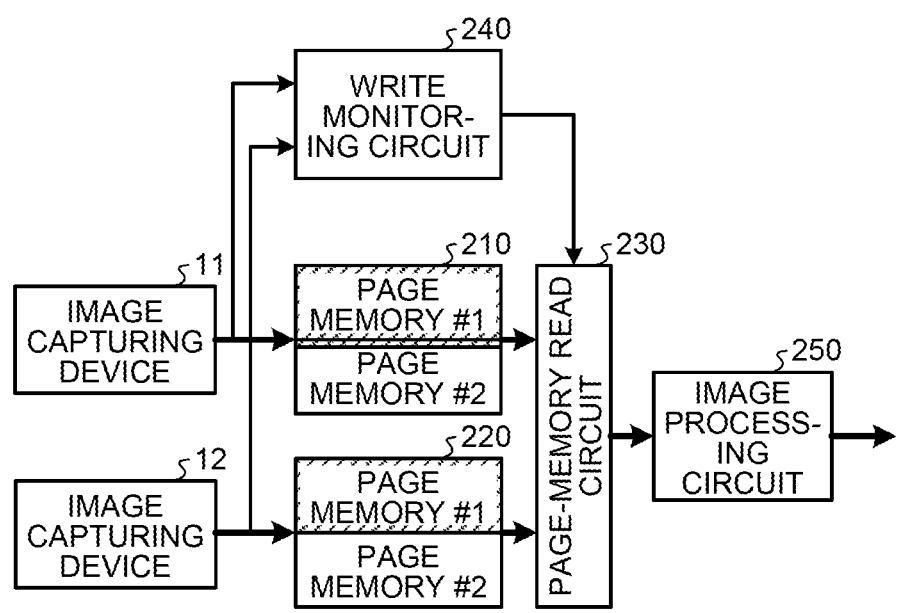
FIG. 4 is a diagram illustrating how pieces of image data are stored in page memories according to the embodiment.

FIG. 3 is a diagram illustrating how pieces of image data are transferred in the embodiment. FIG. 4 is a diagram illustrating how pieces of image data are stored in the page memories 210 and 220. Signals are plotted in FIG. 3 against time on the horizontal axis.

In FIG. 3, signals output from the image capturing device 11 are indicated in the top zone, in which Vsync_A denotes a vertical sync signal (output only once at a leading end of each page of a two-dimensional image); Hsync_A denotes a horizontal sync signal (output at a leading end of each line); DE_A denotes a data enable signal; and each of A(1), A(2), A(3), . . . denotes an image data piece of one line. Signals output from the image capturing device 12 are indicated in the middle zone, in which Vsync_B denotes a vertical sync signal; Hsync_B denotes a horizontal sync signal; DE_B denotes a data enable signal; and each of B(1), B(2), B(3), . . . denotes an image data piece of one line. The image capturing devices 11 and 12 also output pixel clocks, which are omitted from FIG. 3.

As indicated in the top and middle zones of FIG. 3, it is assumed that the pieces of image data output from the image capturing devices 11 and 12 are out of synchronization by some lines. More specifically, it is assumed that the piece of image data output from the image capturing device 12 is delayed by a few lines relative to the piece of image data output from the image capturing device 11.

Each of the pieces of image data output from the image capturing devices 11 and 12 is sequentially stored line by line in the page memories of the page memory 210, 220. FIG. 4 illustrates how the pieces of image data are stored. Meanwhile, the write monitoring circuit 240 monitors a write state of the pieces of image data that are output from the image capturing devices 11 and 12 and written into the page memories 210 and 220. The write monitoring circuit 240 issues the page-memory-read-start signal to the page-memory read circuit 230 at an instant when a piece of image data output from the image capturing device 11 and corresponding to one page and a piece of image data output from the image capturing device 12 and corresponding to one page have both been stored in one page memory of the page memory 210 and one page memory of the page memory 220, respectively.

In the illustrated example, A(1), A(2), A(3), . . . , which are image data pieces of a leading-end portion of a page, output from the image capturing device 11 are sequentially stored in page memory #1 of the page memory 210. Delayed by a few lines therefrom, B(1), B(2), . . . , which are image data pieces of a leading-end portion of a page, output from the image capturing device 12 are sequentially stored in page memory #1 of the page memory 220. The write monitoring circuit 240 issues the page-memory-read-start signal to the page-memory read circuit 230 at an instant when pieces of image data, each corresponding to one entire page, output from the image capturing devices 11 and 12 have both been stored in this way. In the illustrated example, the page-memory-read-start signal is issued at an instant when an image data piece B(n) of the image capturing device 12 is stored in page memory #1 of the page memory 220.

Upon receiving the page-memory-read-start signal from the write monitoring circuit 240, the page-memory read circuit 230 starts reading out the pieces of image data from the page memories 210 and 220 in a time division manner. More specifically, the page-memory read circuit 230 reads out A(1), which is an image data piece representing the first line, from page memory #1 of the page memory 210 first and sends A(1) to the image processing circuit 250. Subsequently, the page-memory read circuit 230 reads out B(1), which an image data piece representing the first line, from page memory #1 of the page memory 220 and sends B(1) to the image processing circuit 250. Similarly, the page-memory read circuit 230 reads out the image data pieces A(2) and B(2), A(3) and B(3), . . . from page memory #1 of the page memory 210 and page memory #1 of the page memory 220 and sends the image data pieces to the image processing circuit 250 in order. The page-memory read circuit 230 also transmits sync signals and the like to the image processing circuit 250.

The image processing circuit 250 sequentially performs the predetermined image processing on each pair of the image data pieces A(1) and B(1), A(2) and B(2), A(3) and B(3), . . . sent from the page-memory read circuit 230 in real time, and outputs the image data pieces. This is illustrated in the bottom zone of FIG. 3. In the bottom zone, Vsync_O denotes a vertical sync signal for the image processing circuit 250; Hsync_O denotes a horizontal sync signal (output at a leading end of each line) for the same; and DE_O denotes a data enable signal for the same. O(1) denotes a pair of the image-processed image data pieces (A)1 and (B)1. Similarly, O(2) denotes a pair of the image-processed output image data pieces (A)2 and (B)2.

As described above, in the embodiment, the page memories 210 and 220 each including the page memories for two pages are used. Pieces of image data output from the image capturing devices 11 and 12 are stored in the page memories 210 and 220. The page-memory read circuit 230 reads out the pieces of image data from the page memories 210 and 220 in the time division manner and transmits the pieces of image data to the single image processing circuit 250. The image processing circuit 250 performs the predetermined image processing on the pieces of image data output from the image capturing devices 11 and 12 collectively at once. Because the need of having image processing circuits that are respectively associated with the image capturing devices is eliminated, the amount of hardware of the image processing circuit can be reduced. As a result, an increase in cost can be reduced.

Moreover, in the embodiment, the write monitoring circuit 240 issues the page-memory-read-start signal to the page-memory read circuit 230 at an instant when a piece of image data output from the image capturing device 11 and corresponding to one page and a piece of image data output from the image capturing device 12 and corresponding to one page have both been stored in one page memory of the page memory 210 and one page memory of the page memory 220, respectively. Accordingly, it is possible to deliver pieces of image data output from the image capturing devices 11 and 12 and representing a same page to the downstream image processing circuit 250 properly.

An embodiment of the present invention has been described above, but the present invention is not limited to the image capturing apparatuses configured as illustrated in the drawings and the image processing method. As already described above, the number of the image capturing devices can be three or more. The page memory is not necessarily two-page memory.

According to an aspect of the embodiment, it is unnecessary for an image capturing apparatus including a plurality of image capturing devices to include a plurality of image processing units that are respectively associated with the plurality of image capturing devices. Accordingly, an increase in cost can be reduced. Moreover, using a single image processing unit allows handling pieces of image data output from the plurality of image capturing devices as image data output from a single image capturing device. Accordingly, complexity in data handling is resolved. Moreover, using a write monitoring unit allows properly delivering pieces of image data output from the plurality of image capturing devices and representing a same line to the image processing unit. Accordingly, reliability is enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image capturing apparatus comprising:
a plurality of image capturing sensors;
a plurality of page memories for the image capturing sensors, respectively, each page memory storing a piece of image data output from the corresponding image capturing sensor;
a page-memory read circuit configured to read pieces of image data stored in the page memories line by line in a time division manner such that each line corresponds to a row of a two-dimensional captured image and consecutive lines are read from different page memories;
a single image processing circuit configured to perform predetermined image processing on the pieces of image data read from the page memories for the image capturing sensors line by line in the time division manner; and a write monitoring circuit configured to
monitor write states of the pieces of image data that are output from the image capturing sensors and written into the page memories, and
control the page-memory read circuit to start reading the pieces of image data from the page memories.

2. The image capturing apparatus according to claim 1, wherein
each of the page memories has a capacity to store at least two pages of image data, and
the write monitoring circuit is configured to instruct the page-memory read circuit to start reading the pieces of image data from any one of the page memories at an instant when the pieces of image data corresponding to one page are stored in the any one of the page memories from the corresponding image capturing sensor.

3. The image capturing apparatus according to claim 1, wherein a frequency of read clock of the page memories is greater than a frequency of write clock of the page memories.

4. The image capturing apparatus according to claim 3, wherein a frequency of read clock of the page memories is n times a frequency of write clock of the page memories, n being greater than or equal to 2.

5. An image processing method performed in an image capturing apparatus that includes a plurality of image capturing sensors and a plurality of page memories for the image capturing sensors, respectively, each page memory storing a piece of image data output from the corresponding image capturing sensor, the image processing method comprising:

reading pieces of image data stored in the page memories line by line in a time division manner such that each line corresponds to a row of a two-dimensional captured image and consecutive lines are read from different page memories;

performing predetermined image processing on the pieces of image data read from the page memories for the image capturing sensors line by line in the time division manner;

monitoring write states of the pieces of image data that are output from the image capturing sensors and written into the page memories; and controlling a page-memory read circuit to start reading the pieces of image data from the page memories.

6. The image processing method according to claim 5, wherein
each of the page memories has a capacity to store at least two pages of image data, and
the image processing method further comprises instructing the page-memory read circuit to start reading the pieces of image data from any one of the page memories at an instant when the pieces of image data corresponding to one page are stored in the any one of the page memories from the corresponding image capturing sensor.

7. The image processing method according to claim 6, wherein a frequency of read clock of the page memories is greater than a frequency of write clock of the page memories.

8. The image processing method according to claim 7, wherein a frequency of read clock of the page memories is n times a frequency of write clock of the page memories, n being greater than or equal to 2.

* * * * *